J. DAIN.
HAY RAKE.
APPLICATION FILED APR. 30, 1904.
947,803.
Patented Feb. 1, 1910.
2 SHEETS—SHEET 1.
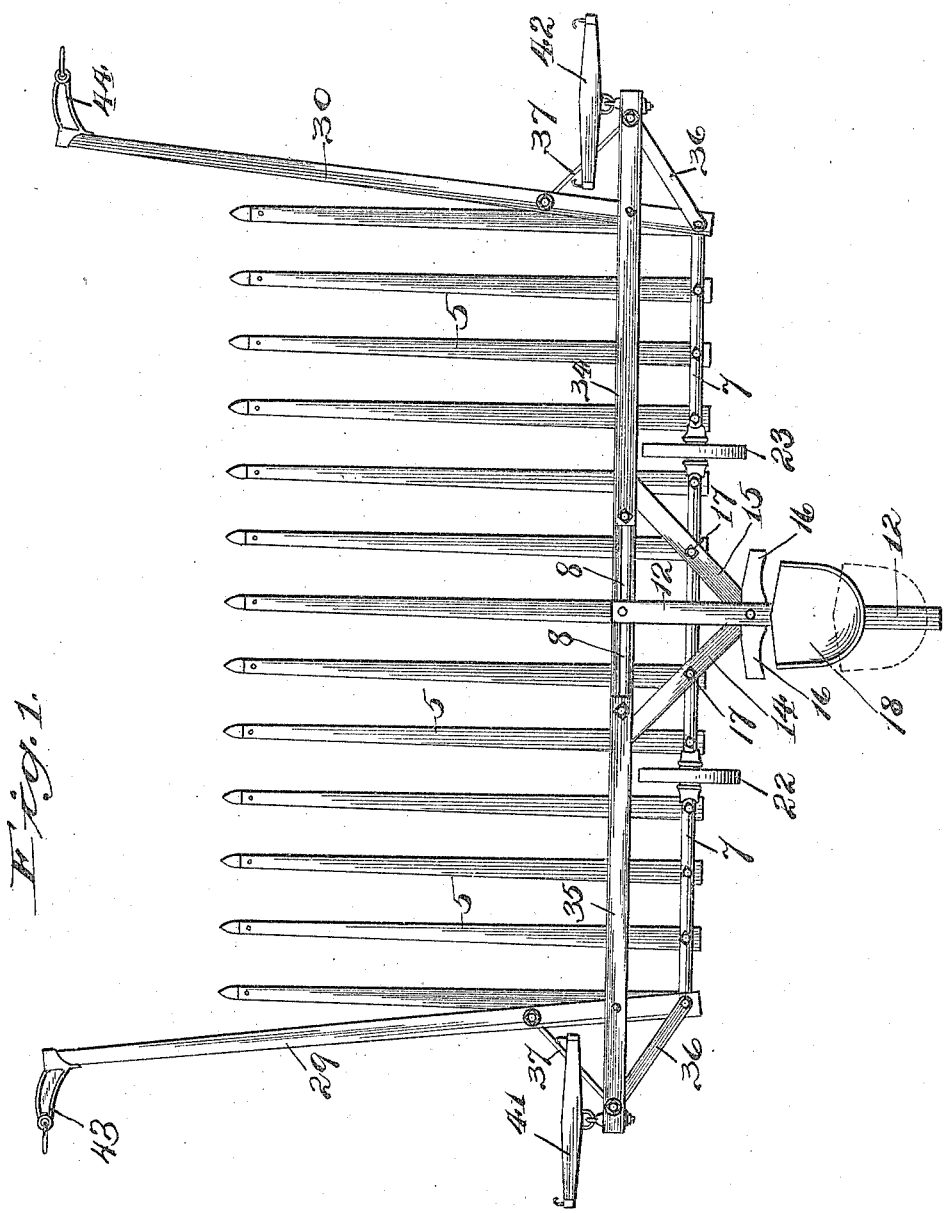
Witnesses:
JB Weir
Inventor.
Joseph Dain,
by Bond, Adams, Pickard & Jackson
his Attys.

J. DAIN.
HAY RAKE.
APPLICATION FILED APR. 30, 1904.
947,803.
Patented Feb. 1, 1910.
2 SHEETS—SHEET 2.
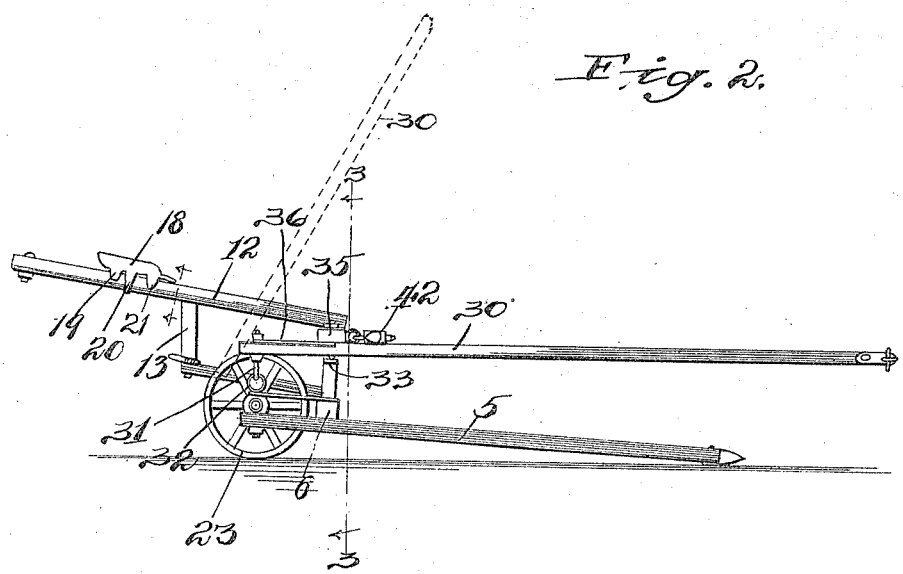
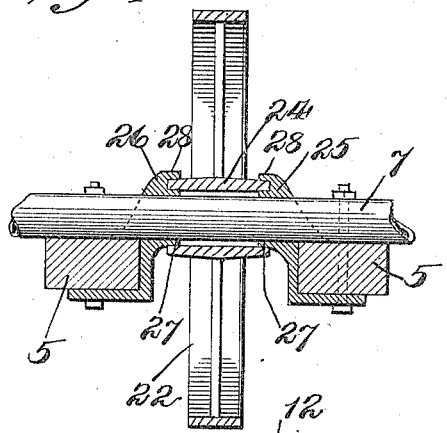
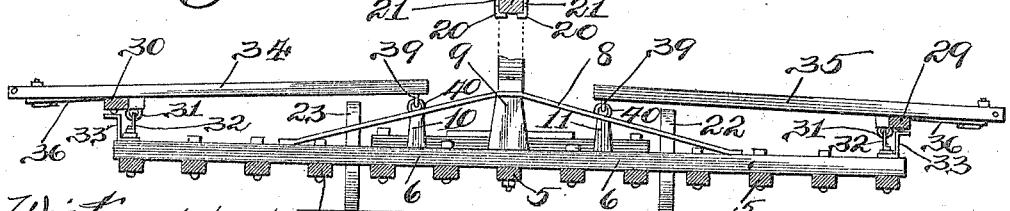

UNITED STATES PATENT OFFICE.

JOSEPH DAIN, OF OTTUMWA, IOWA.

HAY-RAKE.

947,803.  Specification of Letters Patent.  Patented Feb. 1, 1910.

Application filed April 30, 1904. Serial No. 205,735.

*To all whom it may concern:*

Be it known that I, JOSEPH DAIN, a citizen of the United States, residing at Ottumwa, in the county of Wapello and State of Iowa, have invented certain new and useful Improvements in Hay-Rakes, of which the following is a specification, reference being had to the accompanying drawings.

My invention relates to rakes, and has particularly to do with that type known as "sweep-rakes",—in which the horses are arranged abreast of the rake-teeth at opposite ends of the rake-head, so that the raking is done between the horses.

The object of my invention is to provide certain improvements in rakes of this description, by which a stronger and more efficient construction is secured, and, at the same time, the cost of manufacture reduced.

One of the principal features of my present invention consists in making the draft-bars serve also as parts of the rake-head,—thereby making it unnecessary to employ as much material in the construction of the head as formerly.

Another feature is the provision of a truss for bracing the ends of the rake-head and connecting the rake-head with the draft-bars.

My invention also includes improved means for mounting the carrying-wheels, and other details of construction which will be hereinafter pointed out.

What I regard as new is set forth in the claims.

In the accompanying drawings,—Figure 1 is a plan view; Fig. 2 is an end elevation; Fig. 3 is a section on line 3—3 of Fig. 2; and Fig. 4 is a sectional detail, illustrating the manner of mounting the carrying-wheels.

Referring to the drawings,—5 indicates the rake-teeth, which, as shown in Figs. 1 and 3, are connected together by a crossbar 6, placed near the rear ends of the rake-teeth, and a tubular bar 7, placed substantially at the rear ends thereof. The rake-teeth are thus rigidly secured together, but any tooth may be removed by removing the bolts which connect it to said bars 6—7. The ends of the rake-head are braced and connected with the draft-bars by means of a truss composed of the cross-bar 6, a tie-rod or bar 8 and struts or blocks 9—10—11 which rest upon the bar 6 and support the inner portions of the tie-rod 8,—the strut 9 being at the center, as shown in Fig. 3.

The tie-rod or bar 8 is preferably a channel bar, but it may be of any other suitable form. The ends of said bar are connected to the cross-bar 6 between its ends, as shown in Fig. 3. It will be noted that the cross-bar 6 is placed forward of the rear ends of the rake-teeth and of the axle bar 7, as best shown in Fig. 2.

12 indicates a seat-supporting bar, which at its forward end is secured to the rake-head substantially over the tie-rod 8 of the truss and extends rearwardly, being supported at the rear upon a block 13 carried by converging bars 14—15 which extend back from the cross-bar 6, to which they are secured, coming together under the supporting block 13, as shown in Figs. 1 and 2. A foot-rest 16 is secured to the rear end-portions of said bars 14—15 substantially under the block 13. The bars 14—15 are secured not only to the cross-bar 6, but also to the axle-bar 7 by bolts 17, as shown in Fig. 1.

18 indicates the seat, which is mounted on the bar 12 back of the rake head and is adapted to slide longitudinally thereof,—it being held in position by arms 19—20—21 which extend down beside the bar 12, as shown in Fig. 2. The lower ends of the arms 20 extend under the seat-bar 12, as shown in Fig. 3, so that the seat cannot readily be displaced.

22—23 indicate the carrying-wheels, which, as shown in Fig. 1, are mounted on the tubular bar 7 at opposite sides of the center of the rake and about midway between the center of the rake and the ends of said bar. Said wheels are provided with hubs 24, the ends of which project and fit into grooves in brackets 25—26 which are mounted on the bar 7 and are secured thereto and to adjacent rake-teeth 5, as shown in Fig. 4. The brackets of each pair are oppositely disposed, as shown in Fig. 4, and each of said brackets is provided with a bushing 27 which projects into the hub 24 of the wheel,—said bushings forming bearings upon which the wheel rotates. The upper portion 28 of each of said brackets is in the form of a flange which extends over the hub,—thereby affording it ample protection.

It will be noted that by the arrangement of the seat support described the weight of the driver tends to counterbalance the weight of the rake-teeth, so that the pressure of the teeth upon the ground may be regulated by shifting the position of the driver's seat upon the seat-supporting bar.

29—30 indicate the draft-poles, which, as shown in Fig. 1, are mounted at opposite ends of the rake. Said draft-poles are connected at their rear ends with the rake-head,—preferably immediately over the ends of the bar 7,—and are adapted to swing in a substantially vertical plane, as indicated by dotted lines in Fig. 2. To this end, said draft-poles are connected to the rake-head by means of eyelets 31 which interlock with similar eyelets 32 connected to the ends of the brake-head, as shown in Fig. 2.

33 indicates spring supports, mounted on the ends of the bar 6 upon which the draft-poles 29—30 are adapted to rest.

34—35 indicate draft-bars, which extend over, and lie in substantially the same vertical plane as the bar 6,—see Fig. 2. The draft-bars 34—35 are rigidly connected with the draft-poles 29—30, respectively, being braced thereto by means of braces 36—37. The inner ends of said draft-bars are connected with the truss 8, at opposite sides of the center thereof, by eyelets 39—40, as shown in Fig. 3, so as not to interfere with the vertical movement of the draft-poles 29—30. The draft-bars 34—35 extend outward a considerable distance beyond the draft-poles 29—30, and are provided at their outer ends with draft-devices, such as swingletrees 41—42, as shown in Fig. 1. The draft-bars 34—35 serve to brace the draft-poles, and also to prevent lateral movement thereof. They also assist in preventing hay fros passing back of the wheels.

43—44 indicate draft-connections at the forward ends of the draft-poles 29—30.

In operation the horses are hitched to the swingletrees 41—42,—the raking being done between them. As the hay is raked it passes back upon the rake-teeth, but cannot pass back to the wheels, since the truss and draft-bars together form a head which prevents the hay from passing back beyond them. For discharging a load the rake is backed, leaving the hay deposited upon the teeth of a hay-stacker or upon the ground, as may be desired.

The construction above described, though simple is very strong, and is comparatively inexpensive,—thus enabling me to produce a strong and efficient rake at much less cost than has heretofore been possible.

While I have described specifically the construction illustrated in the accompanying drawings, I wish it to be understood that my invention is not restricted to the details of the construction described, except in so far as they are particularly claimed.

That which I claim as my invention and desire to secure by Letters Patent is,—

1. The combination of a series of rake-teeth, a bar connecting the rear ends of said teeth together to form a rake, a cross-bar connecting said teeth together near their rear ends, struts mounted on said cross-bar, a tie-rod extending over said struts and connected at its ends with said cross-bar, forming a truss, supporting wheels back of said cross-bar, and draft devices connected with said truss.

2. The combination of a series of rake-teeth, a bar connecting the rear ends of said teeth together to form a rake, a cross-bar connecting said teeth together near their rear ends, struts mounted on said cross-bar, a tie-rod extending over said struts, and connected at its ends with said cross-bar, forming a truss, supporting wheels back of said cross-bar, draft devices pivotally connected at their inner end-portions with said truss, and means pivotally connecting the outer end-portions of said draft devices with the rake.

3. The combination of a series of rake teeth, means connecting said teeth together to form a rake, draft bars pivotally connected at their inner end portions with the inner portion of the rake, and draft poles connected between their ends with the outer end portions of said draft bars and pivotally connected at their rear end portions with the rake.

4. The combination of a series of rake-teeth, a bar connecting the rear ends of said teeth together to form a rake, a cross-bar connecting said teeth together near their rear ends, struts mounted on said cross-bar, a tie-rod extending over said struts and connected at its ends with said cross-bar, forming a truss, supporting wheels back of said cross-bar, draft-bars extending transversely of the rake over said truss and connected at their inner ends therewith, and draft-poles connected with said draft-bars near their outer ends, the rear ends of said draft-poles being pivotally connected with the rake.

5. The combination of a series of rake teeth, means connecting said teeth together to form a rake, draft bars pivotally connected at their inner end portions with the inner portion of the rake, and draft poles pivotally connected between their ends with said draft bars and connected at their rear ends with the rake.

6. The combination of a series of rake-teeth, a bar connecting the rear ends of said teeth together to form a rake, a cross-bar connecting said teeth together near their rear ends, struts mounted on said cross-bar, a tie-rod extending over said struts and connected at its ends with said cross-bar, forming a truss, supporting wheels back of said cross-bar, draft-bars extending transversely of the rake over said truss and connected at their inner ends therewith, draft-poles connected with said draft-bars near their outer ends, the rear ends of said draft-poles being pivotally connected with the rake, and draft devices connected with the outer ends of said draft-bars.

7. In a sweep-rake, the combination of rake-teeth, means connecting said rake-teeth together to form a rake, supporting-wheels for the rear portion of said rake, a seat-support connected at its forward end with the rake in advance of the wheel axle, and means projecting rearwardly from said wheel axle and forming a support for said seat-support.

8. In a sweep-rake, the combination of rake-teeth, a cross-bar connecting said teeth together near their rear ends, means connecting the rear ends of said teeth together, wheels mounted back of said cross-bar, a seat-support connected at its forward end with the rake in advance of said wheels, and means projecting rearwardly from the rake and supporting said seat-support back of the wheels.

9. In a rake, the combination of rake-teeth, a cross-bar connecting said teeth together to form a rake, a truss for said bar forming a portion of the rake-head, draft-bars hinged at their inner ends to the truss and extended over the rake-head to prevent hay from passing back on to the wheels, draft-poles connected with said draft-bars between the ends of said bars, said poles being also connected with the rake so that they may be moved vertically but not laterally.

10. In a rake, the combination of rake-teeth, means connecting said teeth together to form a rake, a rod secured to said teeth and extending transversely thereof near their rear ends, wheels mounted upon said rod between adjacent rake-teeth, and oppositely-disposed brackets connected to teeth at each side of each of said wheels and engaging the hubs thereof, said brackets having recesses to receive the ends of the hubs and having bushings projecting between said rod and the hubs.

11. The combination of a series of rake teeth, a bar connecting said rake teeth together to form a rake, a truss for said bar, a tubular bar connecting the rear ends of said teeth, supporting wheels mounted on said tubular bar, draft bars extending transversely of the rake and connected at their inner end portions therewith, and means connecting the outer portions of said draft bars with the end portions of said tubular bar.

12. In a rake, the combination of a wheel, rake-teeth, bearing-brackets disposed oppositely to each other and secured to adjacent teeth, said brackets having bushings which extend into the wheel-hub and form bearings therefor.

13. In a rake, the combination of a wheel, rake-teeth, bearing-brackets disposed oppositely to each other and secured to adjacent teeth, said brackets having bushings which extend into the wheel-hub and form bearings therefor, and a shaft extending through said bushings and secured to said teeth.

14. In a rake, the combination of a wheel, rake teeth, bearing-brackets disposed oppositely to each other and secured to adjacent teeth, said brackets having bushings which extend into the wheel-hub and form bearings therefor, and a shaft extending through said bushings and secured to said teeth, each of said brackets having a flange which extends over the upper portion of the wheel-hub.

15. In a rake, the combination of a series of rake-teeth, a bar connecting said teeth together at the rear to form a rake, a truss for said bar, a tubular bar secured to the rake-teeth back of said first-mentioned bar, and wheels mounted intermediately on said tubular bar.

16. The combination of a series of rake teeth, means connecting said teeth together at the rear to form a rake, draft poles, and transversely-disposed draft bars rigidly secured to said draft poles and extending inwardly over the rake teeth, the inner ends of said draft bars being pivotally connected with the rake, said draft poles being pivotally connected with the rake back of said draft bars.

17. The combination of a series of rake teeth, means connecting said teeth together at the rear to form a rake, draft poles, transversely-disposed draft bars rigidly secured to said draft poles and extending inwardly over the rake teeth, the inner ends of said draft bars being pivotally connected with the rake, said draft poles being pivotally connected with the rake back of said draft bars, and draft devices connected with the outer end portions of said draft bars.

18. In a rake, the combination of rake-teeth, a cross-bar connecting said teeth together to form a rake, a truss extending above said rake-teeth, draft-bars extending transversely of the rake over the rake-head, said draft-bars being pivotally connected at their inner ends to the truss, draft-poles connected at their rear ends to the rake and connected with the draft-bars between their ends, and braces rigidly connecting the draft-bars and draft-poles so as to hold them in fixed angular relation to each other.

19. In a rake, the combination of rake-teeth, a cross-bar connecting said teeth together to form a rake, a truss extending above said rake-teeth, draft-bars extending transversely of the rake over the rake-head, said draft-bars being pivotally connected at their inner ends to the truss, draft-poles connected at their rear ends to the rake and connected with the draft-bars between their ends, and braces connecting the outer end portions of the draft-bars and the rear end portions of the draft-poles.

20. In a sweep-rake, the combination of rake-teeth, means connecting said rake-teeth together to form a rake, supporting wheels for the rear portion of said rake, a seat-support connected at its forward end with the rake in advance of the wheel axle, means projecting rearwardly from the rake and forming a support for said seat-support, and a footrest carried by said rearwardly-projecting means.

JOSEPH DAIN.

Witnesses:
E. H. EMERY,
G. F. TROTTER.

Corrections in Letters Patent No. 947,803.

It is hereby certified that in Letters Patent No. 947,803, granted February 1, 1910, upon the application of Joseph Dain, of Ottumwa, Iowa, for an improvement in "Hay-Rakes," errors appear in the printed specification requiring correction as follows: Page 2, line 15, the compound word "brake-head" should read *rake-head;* and page 2, lines 115–116, the word "pivotally" should be stricken out and inserted before the word "connected," line 117, same page; and that the said Letters Patent should be read with these corrections therein that the same may conform to the record of the case in the Patent Office.

Signed and sealed this 3d day of May, A. D., 1910.

[SEAL.]                         C. C. BILLINGS,
*Acting Commissioner of Patents.*